US 6,578,698 B2

(12) United States Patent
Lindström

(10) Patent No.: US 6,578,698 B2
(45) Date of Patent: Jun. 17, 2003

(54) SAFETY ARRANGEMENT IN A PACKAGE TURNING DEVICE

(75) Inventor: Gert Lindström, Blentarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/163,464

(22) Filed: Jun. 7, 2002

(65) Prior Publication Data

US 2003/0019720 A1 Jan. 30, 2003

Related U.S. Application Data

(63) Continuation of application No. PCT/SE00/02445, filed on Dec. 6, 2000.

(30) Foreign Application Priority Data

Dec. 8, 1999 (SE) .............................. 9904481

(51) Int. Cl.⁷ .............................................. B65G 47/24
(52) U.S. Cl. .................. 198/374; 198/375; 198/379; 198/380; 198/382
(58) Field of Search .................. 198/374, 375, 198/379, 380, 382, 376

(56) References Cited

U.S. PATENT DOCUMENTS 3,250,373 A * 5/1966 Yanoshita .................. 198/379
4,302,919 A * 12/1981 Hartness .................... 53/250
4,605,115 A * 8/1986 Genans .................. 198/341.01
4,741,429 A * 5/1988 Hattori et al. ............... 198/456

FOREIGN PATENT DOCUMENTS

DE        39 33 759 A1    4/1991

* cited by examiner

Primary Examiner—Joseph E. Valenza
Assistant Examiner—Richard Ridley
(74) Attorney, Agent, or Firm—Burns, Doane, Swecker & Mathis, L.L.P.

(57) ABSTRACT

The invention relates to a safety arrangement in a package turning device. The package turning device is of the type which turns selected packages which are conveyed on a conveyor path through the package turning device. The package turning device essentially comprises a piston and cylinder assembly whose piston rod is disposed to move parallel with the conveyor path, a turning member and a gripping member. The safety arrangement includes an anchorage disposed on the piston rod of the piston and cylinder assembly, and a bracket. The bracket is disposed to support the turning member and the gripping member. The anchorage and the bracket are united in spring-biased fashion and enclose between them a cavity. An incoming air conduit and an outgoing air conduit are connected to the cavity. A pressure guard is disposed on the outgoing air conduit. The cavity is closed in the normal operation of the package turning device. When the gripping member is subjected to a force A, a gap occurs between the anchorage and the bracket and the pressure in the cavity becomes zero. The pressure guard on the outgoing air conduit emits a signal to the control system of the package turning device and the movement of the piston rod is arrested immediately.

10 Claims, 5 Drawing Sheets

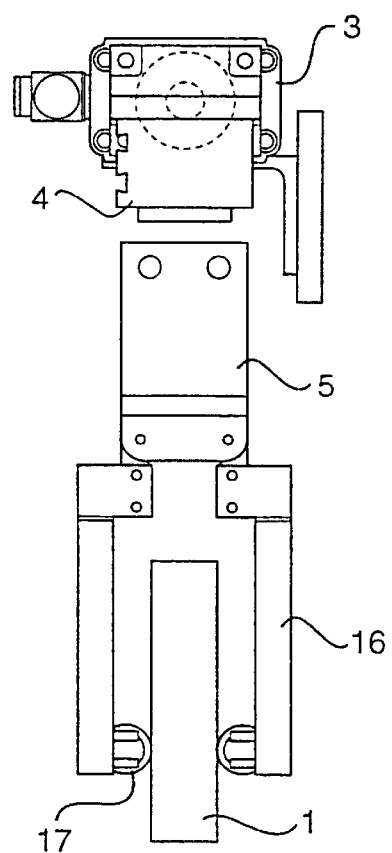
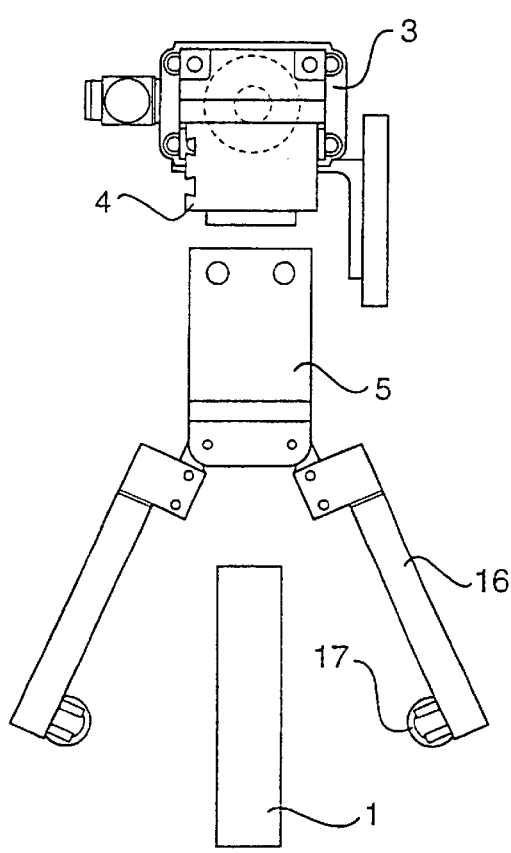
Fig 4
Fig 5

SAFETY ARRANGEMENT IN A PACKAGE TURNING DEVICE

This application is a continuation of International Application No. PCT/SE00/02445 filed on Dec. 6, 2000.

This application claims priority under 35 U.S.C. §§ 119 and/or 365 to Appln. No. 9904481-0 filed in Sweden on Dec. 8, 1999; the entire content of which is hereby incorporated by reference.

FIELD OF THE INVENTION

The present invention relates to a safety arrangement in a package turning device of the type which turns selected packages which are conveyed on a conveyor path, the package turning device essentially comprising a piston and cylinder assembly with a piston rod disposed to move parallel with the conveyor path, a turning member and a gripping member.

BACKGROUND OF THE INVENTION

Package turning devices of the type which turn selected packages being conveyed on a conveyor path are employed, for example, for turning one of the packages in a multipack in order, by such means, to conceal the bar code carried on the package. The bar code on each package contains, int. al., information on the price of the individual package and when the package is included in a multipack, this multipack will have a new bar code which indicates the price of the multipack unit. For example, the multipack may contain two or more individual packages.

Multipacks are often employed for single-use disposable packages of small volume for liquid foods, such as juices and fruit drinks. These single-use disposable packages are manufactured from a packaging laminate with a core layer of paper or paperboard to which are laminated different layers of thermoplastic and possibly aluminum foil (Alifoil). The packaging material, which most generally occurs in web form, is formed in a filling machine into a tube and is longitudinal-sealed. The tube is filled with the intended contents, whereafter it is transversely sealed and severed in the seals to form individual packaging blanks. The packaging blanks are finally formed and normally obtain a parallelepipedic configuration.

With filling, machines which are developed to work at increasingly higher capacity, it is a requirement that the distribution equipment, such as package turning devices, which normally accompany a filling machine have the same capacity. When the finished packages depart from the filling machine, they are conveyed on a conveyor path and in order to avoid the accumulation of packages, a turning device (where applicable) must be able to carry out the turning operation of selected packages while the packages pass along the conveyor path.

Turning devices for packages of the above-outlined type are available on the market and they generally consist of a pneumatic or hydraulic piston and cylinder assembly, with a reciprocating movement which is parallel with the conveyor path on which the packages are being conveyed. On the piston rod of the assembly, there is disposed a turning member as well as members for gripping the package. Turning devices of this type are well-known to those skilled in the art.

However, it has proved that a piston and cylinder assembly of a size which is suitable for executing the turning operation does not possess sufficient accuracy as regards adapting the speed of the piston rod to the conveyor path so that the gripping member can grip the package in the correct position. If the package is not gripped centrally, there is a risk that the package is overturned and thrown outside the conveyor path, or that it topples over and causes disruption in the distribution equipment. Piston and cylinder assemblies of this size have moreover proved to be sensitive to the environment in which they are placed. In the event of disruption in the distribution equipment, there is always the risk that the packages are ruptured and that the product sloshes or sprays out in its surroundings. Since the product, normally juices and fruit drinks, contains sugar, the result will be a tacky surface on those parts of the distribution equipment which have been subjected to product sloshing.

One method of solving this problem is naturally to employ a piston and cylinder assembly which is considerably more robust. By employing a more robust assembly, a higher degree of accuracy will be obtained for the movement of the assembly in relation to the conveyor path, and a more robust assembly is also more resistant to the environment in which it is to operate. However, the employment of a more robust piston and cylinder assembly entails that the risk of damage to the package proper and the equipment increases when there is a sudden operational stoppage in the distribution equipment. It must therefore be ensured that the machine stops immediately when this occurs. Operational stoppage may, for example, be because the movement of the gripping member is prevented in that packages topple over or that a foreign object intervenes.

SUMMARY OF THE INVENTION

One object of the present invention is to realise a safety arrangement which is triggered rapidly and distinctly.

A further object of the present invention is that it should not contain components which are sensitive to the environment in which the arrangement is placed.

These and other objects have been attained according to the present invention in that an arrangement of the type described by way of introduction has been given the characterising features that the safety arrangement includes an anchorage disposed on the piston rod of the piston and cylinder assembly, and a bracket which is disposed to support the turning member and the gripping member, the anchorage and the bracket being united in spring-biased fashion so that they enclose a cavity, and that an incoming air conduit and an outgoing air conduit are connected to the cavity, with a pressure guard disposed on the outgoing air conduit.

Preferred embodiments of the present invention have further been given the characterising features as set forth in the appended subclaims.

BRIEF DESCRIPTION OF THE DRAWINGS

One preferred embodiment of the present invention will now be described in greater detail hereinbelow, with particular reference to the accompanying Drawings. In the accompanying Drawings:

FIG. 4 is a side elevation of the gripping member in a closed position;

FIG. 5 is a side elevation of the gripping member in an open position; and

Figure 1:
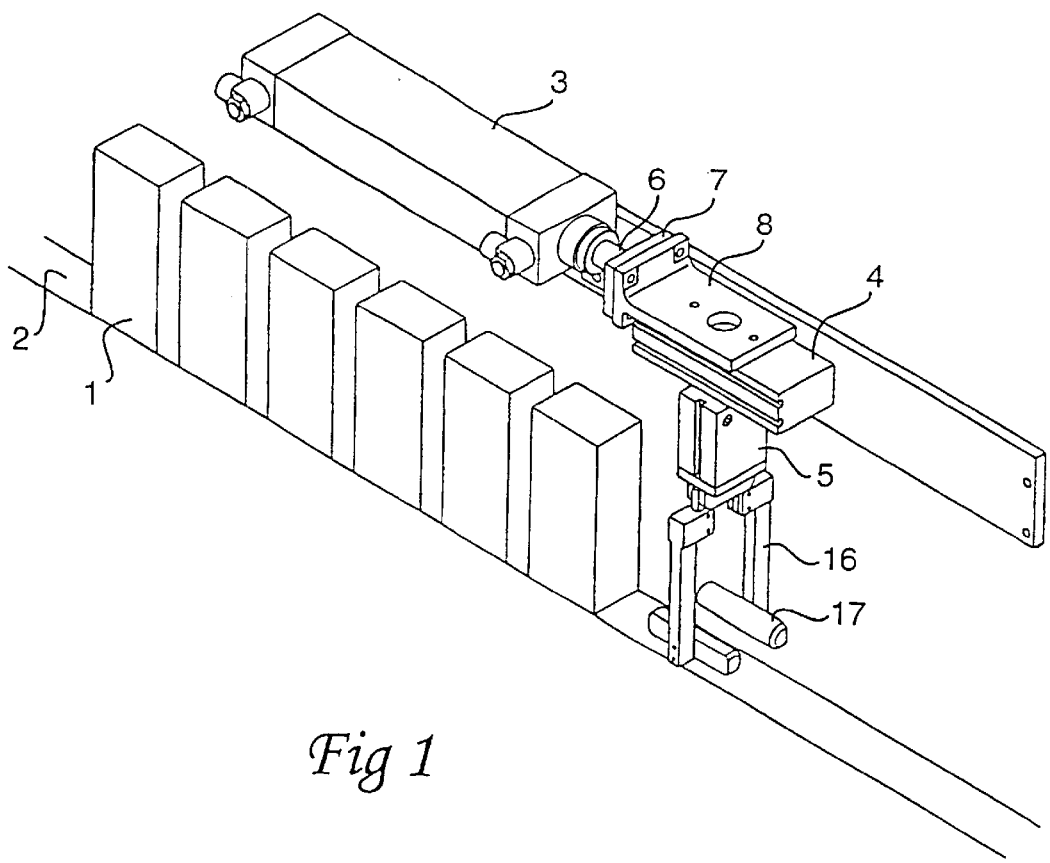
FIG. 1 shows a package turning device of the type with which the arrangement according to the present invention may be employed.
Figure 2:
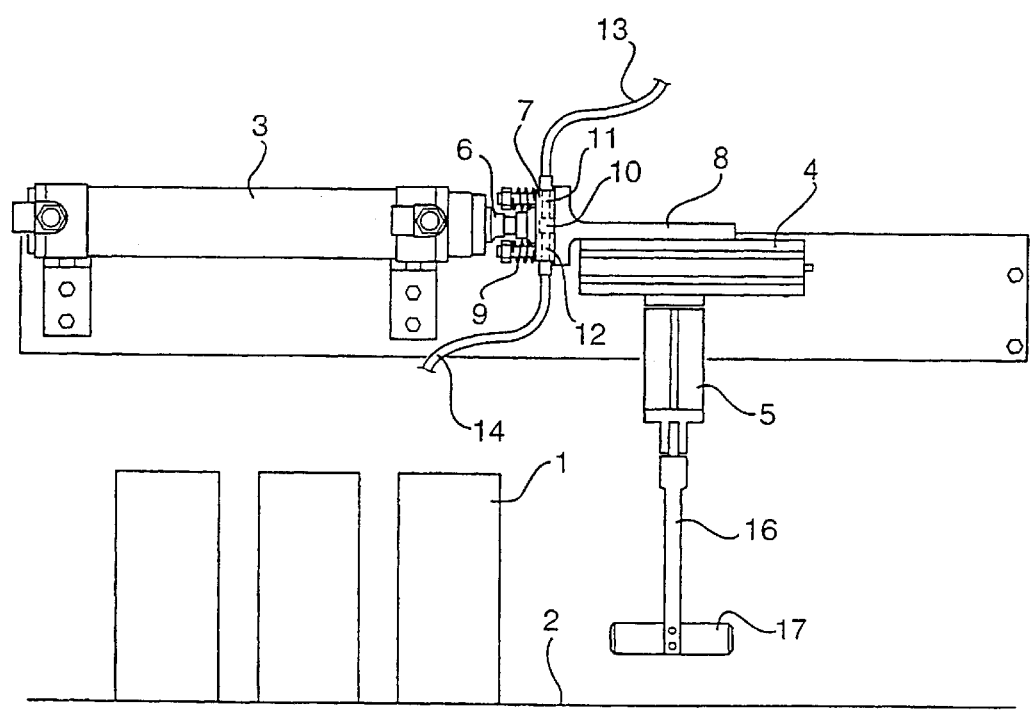
FIG. 2 is a side elevation of a package turning device in normal operational position.

The accompanying Drawings show only those details essential to an understanding of the present invention.

DETAILED DESCRIPTION OF THE INVENTION

The safety arrangement according to the present invention is intended to be employed for a package turning device of the type which is shown in FIGS. 1–6. The turning device is intended to turn selected packages 1. The packages 1 may be single-use disposable packages of the type which is employed for juices and fruit drinks of various types. The packages 1 are filled and formed in a filling machine (not shown) and they may, as shown, display a parallelepipedic configuration. After the filling machine, the packages 1 are conveyed on a conveyor path 2. The path 2 may consist of a conventional conveyor, such as a driven, endless chain, The conveyor path 2 runs through the package turning device, or alternatively a system of different paths.

The package turning device essentially comprises a piston and cylinder assembly 3, a turning member 4 and a gripping member 5. In the preferred embodiment of the present invention, the piston and cylinder assembly 3 is pneumatic. Alternatively, the assembly 3 may be hydraulic. The piston and cylinder assembly 3 is mounted such that its piston rod 6 may reciprocate parallel with the conveyor path 2. The forward going movement of the piston rod 6 is adapted so that it moves forward at the same speed as the conveyor path 2. In that the piston and cylinder assembly 3 is over dimensioned in relation to the work it is to carry out, increased control capability is obtained, which makes it easier to adapt the speed of the piston rod 6 to the speed of the conveyor path 2. The service life of the assembly 3 is also considerably increased in that the more robust assembly 3 is considerably more resistant to the environment in which it works.

An anchorage 7 is mounted on the piston rod 6. A bracket 8 is mounted against the anchorage 7. The anchorage 7 and the bracket 8 are united in spring-biased fashion by means of springs 9. The turning member 4 with the gripping member 5 is mounted on the bracket 9.

Between the spring-biased, united anchorage 7 and the bracket 8, there is a small cavity 10. The cavity 10 may be disposed either in the anchorage 7 or alternatively in the bracket 8. The cavity 10 may also be formed so that it is accommodated in both anchorage 7 and bracket S. The anchorage 7 and the bracket 8 are mounted such that the cavity 10 is enclosed in the normal operation of the package turning device, when the anchorage 7 and the bracket 8 are held together by means of the springs 9.

Two apertures 11, 12 are provided to the cavity 10, The one aperture 11 is connected to an incoming air conduit 13, while the other aperture 12 is connected to an outgoing air conduit 14. The incoming air conduit 13 is connected to a source of compressed air (not shown). A regulator (not shown) is also provided on the incoming air conduit 13 so that the incoming air may be regulated to a desired level. A pressure guard 19 is provided on the outgoing air conduit 14. The pressure guard 19 is suitably placed outside the package turning device, in a dry and benign environment.

In the preferred embodiment of the present invention, the regulator on the incoming air conduit 13 is set at 0.5 bar. Levels below 0.5 bar require a specific and more expensive pressure guard. Levels above 0.5 bar may also be employed and, by omitting the regulator, the compressed air can be connected directly to the aperture 11. But the greater the excess pressure of the incoming air, the more powerful must be the springs 9 so as to hold together the anchorage 7 and the bracket 8 under normal operation.

The one aperture 11 to the cavity 10 is powerfully throttled to a diameter of approx. 2 mm. The incoming air conduit 13 must be mounted to this aperture 11. In order to avoid the risk of incorrectly fitting the air conduits 13 and 14, the second aperture 12 may also be throttled since it does not affect the function of the safety arrangement.

The work cycle of the package turning device is apparent from FIGS. 6A–E. Just ahead of the package turning device, there is disposed a conventional brake 15 which ensures that the packages 1 arrive in the turning device with uniform spacing between the packages 1. The Drawings show a turning device which is disposed to turn every third package 1 which is advanced on the conveyor path 2.

Figure 6A:
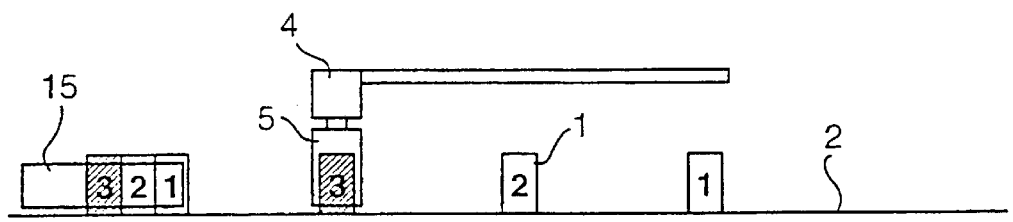
FIGS. 6A–E show the operational sequence of the package turning device.

In FIG. 6A, the packages 1 which are marked with numbers 1 and 2 have passed out from the brake 15 and continue along the path 2. Just after the brake 15, some form of indicator (not shown) is disposed, such as photocells, which are operative to count the number of packages 1 passing.

The gripping member 5 has two gripping claws 16 which are movable between an open and a closed position. The package 1 carrying number 3 is gripped by the gripping member 5 in that its gripping claws 16 clamp against the side of the package 1 as shown in FIG. 4. It is vital that the gripping claws 16 grasp the package one edge of the package 1 centrally so that the turning operation is smooth. If the gripping claws 16 grip at one edge of the package 1, there is a risk that the package 1 is thrown around in the turning operation and that the package 1 risks toppling over. The gripping claws 16 are terminated by rounded holders 17 in order that the package 1 is being handled in as gentle a manner as possible.

Figure 6B:
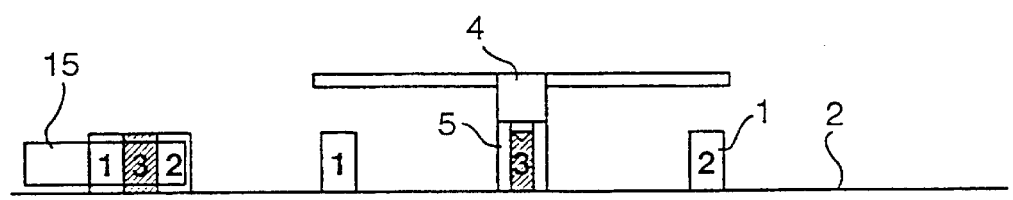

In FIG. 6B, the piston rod 6 of the piston and cylinder assembly 3 has moved along and at the same speed as the conveyor path 2, at the same time as the package 1 which is held fast in the gripping claws 16 is turned through 180°. The package 1 is turned, without being lifted, so that it is constantly in contact with the conveyor path 2.

Figure 6C:
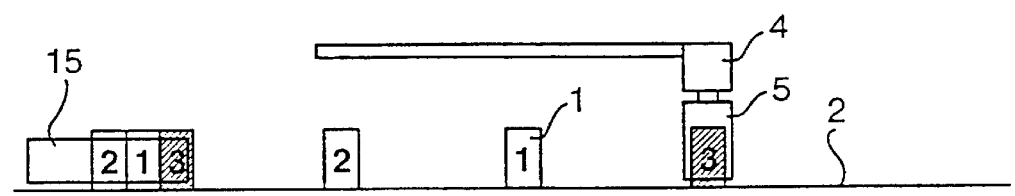
Figure 6D:
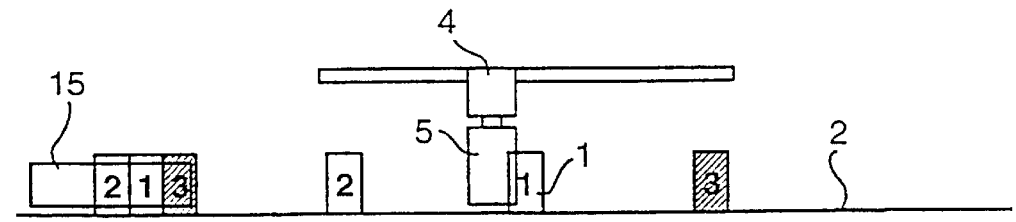
Figure 6E:
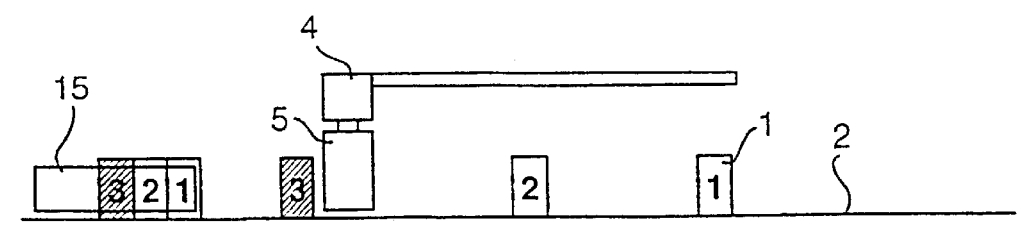

FIG. 6C shows the end position of the turning member 4 and the gripping member 5. Here, the gripping claws 16 are opened as shown in FIG. 5 and the turned package 1 is released in order to continue on the conveyor path 2. In FIG. 6D, the piston rod 6 returns to its starting position. During the entire return movement, the gripping claws 16 are in the open position in order that those packages 1 which have been passed on the way back are not disrupted in their movement. FIG. 6E shows the gripping member 5 back in its starting position read to grip the new package 1 which is marked with number 3.

After the packages 1 have departed from the turning device with every third package 1 turned through 180°, the packages 1 continue on the conveyor path 2 to further distribution equipment. Such distribution equipment may, for example, consist of a shrink film wrapper, where the packages 1 three-by-three, are surrounded by a shrink or stretch film to form a multipack.

Figure 3:
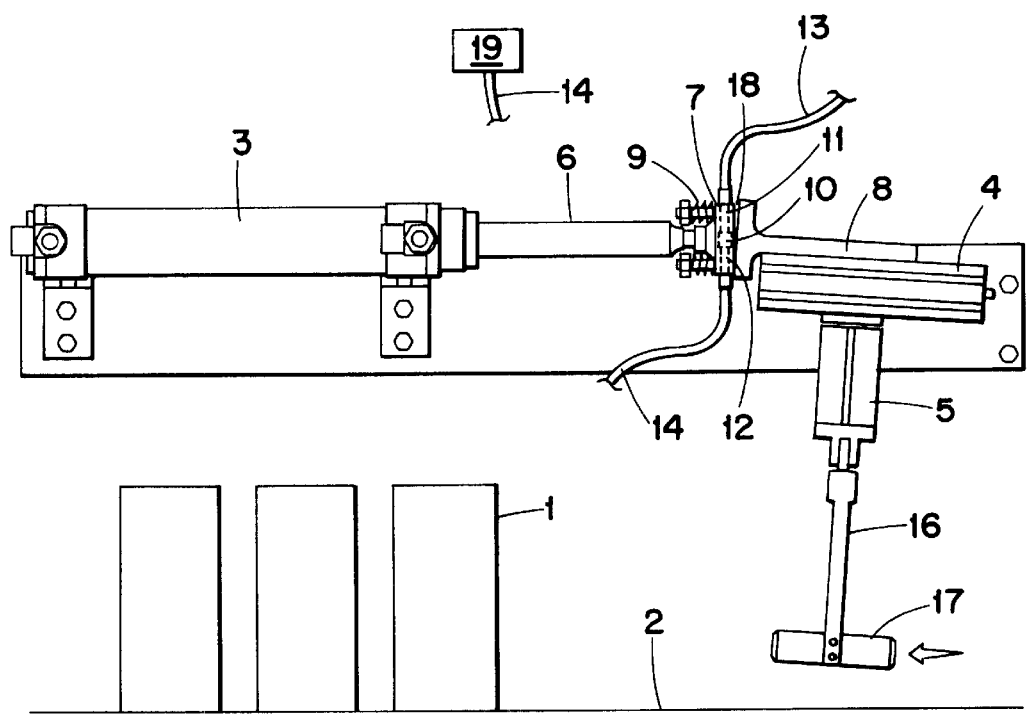
FIG. 3 is a side elevation of a package turning device in the event of an operational stoppage.

Both FIGS. 6A–E and FIG. 2 show the package turning device in normal operation, If a toppled package 1 or a foreign object intervenes, the gripping claws 16 will be subjected to a force A as shown in FIG. 3. The force A may impinge on the gripping claws 16 both from the front, from behind or from the side, depending upon the movement of the piston rod 6 and what has caused the force A. The gripping member 5 is mounted in the turning, member 4 and the turning member in the bracket 9, so that the force A tips all of these components as a unit. As a result, a slight air gap 18 occurs between the anchorage 7 and the bracket 8.

Since the excess pressure in the cavity 10 is regulated to 0.5 bar, a very slight gap is required for air to bleed out and the pressure in the outgoing air conduit 14 falls to zero. Since the aperture 11 into the cavity 10 is powerfully throttled to a diameter of approx. 2 mm. the area of the gap 18 will rapidly exceed the area of the throttle and the air pressures falls almost instantaneously. The pressure guard registers the pressure drop and emits a signal to the control system of the package turning device which immediately stops the package turning device. By having rapid and distinct signal, the movement of the piston rod 6 is quickly arrested and rapid damage to both packages 1 and equipment is reduced.

By employing air for indicating a disruption in the operation of the package turning device, there will be obtained a safety arrangement which includes no sensitive electric components. The pressure guard which is required and the pressure regulator which is provided in the preferred embodiment may be placed in a space where they do not run the risk of being sprayed with sugary product.

As will have been apparent from the foregoing description, the present invention realises a safety arrangement which, in a simple and reliable manner, immediately gives a signal to the package turning device to stop the movement of the piston rod in the event of a sudden operational stoppage. Since the arrangement does not include any sensitive or expensive components, a safety arrangement will be obtained which is relatively economical and which has a high expected service life.

The present invention should not be considered as restricted to that described above and shown on the Drawings, many modifications being conceivable without departing from the scope of the appended Claims.

What is claimed is:

1. A safety arrangement in a package turning device of the type which turns selected packages which are conveyed on a conveyor path, the package turning device essentially comprising a piston and cylinder assembly with a piston rod disposed to move parallel with the conveyor path, a turning member and a gripping member, wherein the safety arrangement includes an anchorage disposed on the piston rod of the piston and cylinder assembly, and a bracket which is disposed to support the turning member and the gripping member, the anchorage and the bracket being united in spring-biased fashion so that they enclose a cavity, and that an incoming air conduit and an outgoing air conduit are connected to the cavity, with a pressure guard disposed on the outgoing air conduit.

2. The safety arrangement as claimed in claim 1, wherein an aperture between the cavity and the incoming air conduit is throttled to a diameter of approx. 2 mm.

3. The safety arrangement as claimed in claim 2, wherein a pressure regulator is disposed on the incoming air conduit, and that the incoming air is regulated to 0.5 bar.

4. The safety arrangement as claimed in claim 1, wherein the cavity is provided in the anchorage.

5. The safety arrangement as claimed in claim 1, wherein the cavity is provided in the bracket.

6. The safety arrangement as claimed in claim 1, wherein the gripping member has two gripping claws movable between an open and a closed position.

7. The safety arrangement as claimed in claim 6, wherein each gripping claw is terminated by a rounded holder.

8. The safety arrangement as claimed in claim 1, wherein the safety arrangement is disposed to trigger is a force A acts on the gripping member so that an air gap occurs between the anchorage and the bracket.

9. The safety arrangement as claimed in claim 1, wherein the piston and cylinder assembly is pneumatic.

10. The safety arrangement as claimed in claim 1, wherein the piston and cylinder assembly is hydraulic.

* * * * *